United States Patent
Huang et al.

(10) Patent No.: US 10,866,468 B2
(45) Date of Patent: Dec. 15, 2020

(54) DISPLAY SUBSTRATE, DISPLAY PANEL, AND METHOD FOR PREPARING THE SAME

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Shiqiang Huang, Beijing (CN); Wei Xue, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/349,870

(22) PCT Filed: Jan. 15, 2018

(86) PCT No.: PCT/CN2018/072582
§ 371 (c)(1),
(2) Date: May 14, 2019

(87) PCT Pub. No.: WO2018/223701
PCT Pub. Date: Dec. 13, 2018

(65) Prior Publication Data
US 2019/0271887 A1     Sep. 5, 2019

(30) Foreign Application Priority Data
Jun. 5, 2017 (CN) .......................... 2017 1 0415420

(51) Int. Cl.
*G02F 1/1343* (2006.01)
*G02F 1/1362* (2006.01)
*G09G 3/36* (2006.01)

(52) U.S. Cl.
CPC .. *G02F 1/134309* (2013.01); *G02F 1/136286* (2013.01); *G09G 3/3688* (2013.01);
(Continued)

(58) Field of Classification Search
CPC .............. G02F 1/134309; G02F 2001/134318
See application file for complete search history.

(56) References Cited

U.S. PATENT DOCUMENTS

2002/0131003 A1   9/2002   Matsumoto
2005/0088582 A1*  4/2005   Park ................. G02F 1/134309
                                                                 349/43
(Continued)

FOREIGN PATENT DOCUMENTS

CN   202837757 U   3/2013
CN   103278971 A   9/2013
(Continued)

OTHER PUBLICATIONS

First Office Action for CN Appl. No. 201710415420.X, dated May 22, 2019.
(Continued)

*Primary Examiner* — Alexander P Gross
(74) *Attorney, Agent, or Firm* — The Webb Law Firm

(57) ABSTRACT

The present disclosure relates to display substrate, display panel, and method for preparing the same. The display substrate comprises: a base substrate; and a common electrode on the base substrate, the common electrode having a hollowed-out portion corresponding to a signal line, wherein the signal line includes at least one of a gate line and a data line. The overlapping area of the common electrode and the signal line can be reduced, the load of the substrate can be reduced, such that the power consumption of the LCD panel can be reduced.

5 Claims, 4 Drawing Sheets

(52) U.S. Cl.
CPC ............ *G02F 2001/134318* (2013.01); *G02F 2201/121* (2013.01); *G09G 2300/0426* (2013.01)

(56) References Cited

U.S. PATENT DOCUMENTS

| | | | |
|---|---|---|---|
| 2016/0334657 A1* | 11/2016 | Jeon | G02F 1/133345 |
| 2018/0300009 A1* | 10/2018 | Kurasawa | G06F 3/0416 |
| 2018/0323224 A1* | 11/2018 | Hung | H01L 27/1288 |

FOREIGN PATENT DOCUMENTS

| | | |
|---|---|---|
| CN | 103676357 A | 3/2014 |
| CN | 104267546 A | 1/2015 |
| CN | 107065329 A | 8/2017 |

OTHER PUBLICATIONS

International Search Report and Written Opinion for International Appl. No. PCT/CN2018/072582, dated Apr. 13, 2018.

* cited by examiner

DISPLAY SUBSTRATE, DISPLAY PANEL, AND METHOD FOR PREPARING THE SAME

CROSS-REFERENCE TO RELATED APPLICATIONS

The present application is a U.S. National Stage Application under 35 U.S.C. § 371 of International Patent Application No. PCT/CN2018/072582, which claims priority to Chinese Application No. 201710415420.X filed on Jun. 5, 2017, the disclosure of both of which i-sare herein incorporated in entirety by reference.

FIELD

The present disclosure relates to the field of display, and in particular, to a display substrate, a display panel, and a method of fabricating the same.

BACKGROUND

Twisted Nematic (TN) panel is a type of liquid crystal display panel. Due to the low production cost, the twisted nematic panel has become the most widely used entry-level LCD panel and is still widely used in the current market. The TN panel has advantages of low output gray level, fast deflection of liquid crystal molecules, short response time, and high refresh rate. The TN panel uses twisted nematic liquid crystal molecules, and relies on a vertical electric field formed between the color filter substrate and the array substrate to control the deflection of the twisted nematic liquid crystal molecules.

However, the conventional display substrates, preparation methods, and display devices still need to be improved.

SUMMARY

According to an aspect of the present disclosure, there is provided a display substrate comprising: a base substrate; and a common electrode on the base substrate, the common electrode having a hollowed-out portion corresponding to a signal line, wherein the signal line includes at least one of a gate line and a data line.

In some embodiments, portions of the common electrode other than the hollowed-out portion communicate with each other.

In some embodiments, an orthographic projection of the hollowed-out portion on the base substrate and an orthographic projection of the data line on the base substrate at least partially overlap.

In some embodiments, an orthographic projection of the hollowed-out portion on the base substrate and an orthographic projection of the gate line on the base substrate at least partially overlap.

In some embodiments, the orthographic projection of the hollowed-out portion on the base substrate and the orthographic projection of the gate line on the base substrate are in one-to-one correspondence.

In some embodiments, the common electrode material in the hollowed-out portion is removed.

According to another aspect of the present disclosure, there is provided a display panel comprising: a display substrate according to any embodiments; and an opposite substrate disposed opposite to the display substrate, wherein the signal line is disposed on a side of the display substrate facing the opposite substrate or on a side of the opposite substrate facing the display substrate.

In some embodiments, the display substrate is a color filter substrate and the opposite substrate is an array substrate; or the display substrate is an array substrate and the opposite substrate is a color filter substrate.

According to a further aspect of the present disclosure, there is provided a method of preparing a display panel, comprising: forming a common electrode on a base substrate of a first substrate; forming a hollowed-out portion, which corresponds to a signal line, in the common electrode by a patterning process, wherein the signal line includes at least one of a gate line and a data line.

In some embodiments, forming a common electrode on the base substrate comprises: forming a common electrode layer on the base substrate; and etching the common electrode layer with a patterned etch mask to form the hollowed-out portion.

In some embodiments, the method further comprises: forming the signal line on a second substrate which is opposite to the first substrate, by using a photolithography mask; wherein forming the common electrode on the base substrate comprises: forming a common electrode layer on the base substrate, the common electrode layer covering an upper surface of the base substrate; coating a side of the common electrode layer which is away from the base substrate with a negative photoresist layer, exposing the photoresist layer based on the photolithographic mask which is used to form the signal line, and developing the photoresist layer, to obtain an etch mask; and etching the common electrode layer to form the hollowed-out portion based on the etch mask.

In some embodiments, the signal line is a data line and the lithography mask for the signal line is a photolithographic mask for forming the data line.

In some embodiments, the signal line is a gate line, and the photolithography mask for the signal line is a photolithographic mask for forming the gate line.

In some embodiments, the first substrate is a color filter substrate or an array substrate.

In some embodiments, material of the common electrode in the hollowed-out portion is removed.

BRIEF DESCRIPTION OF DRAWINGS

The above and/or additional aspects and advantages of the present disclosure will become apparent and readily understood from the descriptions of the embodiments as below in connection with the drawings in which.

DESCRIPTION OF THE REFERENCE SIGNS

Figure 1:
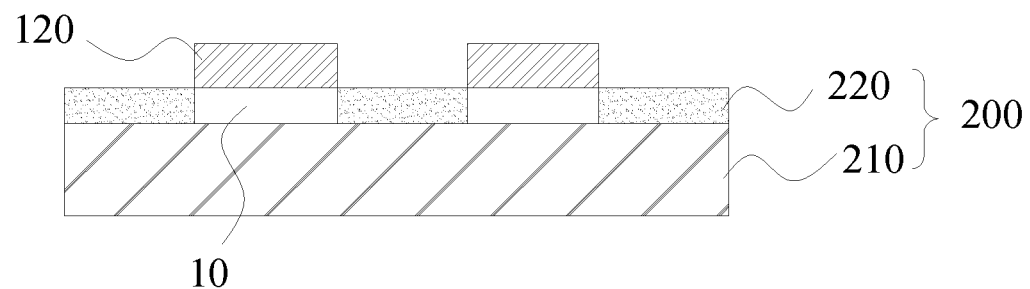
FIG. 1 shows a schematic structural view of a display substrate according to an embodiment of the present disclosure.

100: opposite substrate; 110: opposite substrate; 120: signal line; 121: gate line; 122: data line; 123: pixel electrode; 20: pixel electrode via; 30: active layer; Display substrate; 210: base substrate of display substrate; 220: common electrode; 10: hollowed-out portion; 300: liquid crystal layer; 40: liquid crystal molecules.

DETAILED DESCRIPTION OF ILLUSTRATIVE EMBODIMENTS

The embodiments of the present disclosure are described in detail below, and the examples of the embodiments are illustrated in the drawings, wherein the same or similar reference numerals are used to refer to the same or similar elements or elements having the same or similar functions throughout the drawings. The embodiments described below with reference to the accompanying drawings are intended to be illustrative only, and shall not be construed as limiting.

In the description of the present disclosure, the orientation or positional relationships as indicated by the terms "upper", "lower" or the like are based on the orientation or positional relationships shown in the drawings, and are merely for the convenience of describing the present disclosure and do not require that the inventions of the present disclosure are necessarily constructed and operated in specific orientations, and therefore shall not be construed as limiting the scope of the disclosure.

At present, the display of the TN type display panel generally has a problem of large power consumption. The inventors of the present application had conducted intensive research and a large number of experiments and found that this is mainly due to the excessive load of the substrate (such as array substrate) in the current TN type display panel. The inventors have found through in-depth research that in the TN type display panel, the load of the array substrate mainly includes the following aspects: the resistance of the array substrate electrode line (for example, the gate line) itself, the capacitance between the gate line and the data line, and capacitance between the electrode line (gate line and the data line) and the common electrode. In order to reduce the power consumption of the substrate, the resistances or capacitances of the electrode lines need to be reduced. The resistance of electrode line is determined by the material and thickness of the film layer forming the electrode line, and is difficult to be improved or greatly reduced; and due to the inevitable area in which the gate line and the data line face each other, it is difficult to reduce the capacitance between the gate line and the data line. Therefore, if the capacitance between the electrode line and the common electrode can be reduced, that is, changing the structure of the display panel, the problem of large power consumption of the display panel can be improved.

In an aspect of the disclosure, a display substrate is provided. According to an embodiment of the present disclosure, referring to FIG. 1, the display substrate includes a base substrate 210 and a common electrode 220. The common electrode 220 has a hollowed-out portion 10 provided corresponding to a signal line 120. The signal line includes at least one of a gate line and a data line. According to an embodiment of the present disclosure, the signal line 120 may be located on a side of the display substrate facing an opposite substrate (not shown) or on a side of the opposite substrate facing the display substrate. By reducing the overlapping area of the common electrode and the signal line, the load on the base substrate is lowered, and thus the power consumption of the liquid crystal panel can be reduced.

Figure 2:
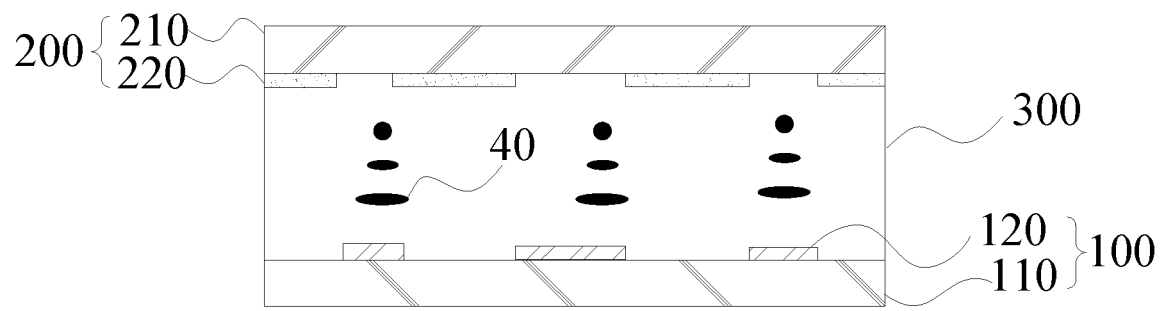
FIG. 2 shows a schematic structural view of a display panel according to an embodiment of the present disclosure.

Those skilled in the art will readily understand that the display substrate can be used to form a display panel, such as a liquid crystal display panel or the like. For example, an opposite substrate can be provided to be bonded to the display substrate, thereby forming space to accommodate liquid crystals with the display substrate and the opposite substrate, thereby forming a display panel. According to an embodiment of the present disclosure, referring to FIG. 2, the structure of the display panel comprising the display substrate may include the opposite substrate 100, the display substrate 200, and the liquid crystal layer 300. The opposite substrate 100 includes an opposite base substrate 110 and the signal line 120, and the signal line 120 is disposed on the opposite base substrate 110. The display substrate 200 includes a base substrate 210 and a common electrode 220. The common electrode 220 is disposed on a side of the base substrate 210, and the common electrode 220 is an electrode having a hollowed-out portion 10 which is disposed corresponding to the signal line 120. The display substrate 200 and the opposite substrate 100 are aligned so as to be bonded. In some example embodiments, the electrode material in the hollowed-out portion 10 of the common electrode 220 is removed.

The respective structures of the display substrate are described in detail below according to specific embodiments of the present disclosure:

Those skilled in the art will readily understand that before the display substrate (first substrate) 200 and the opposite substrate (second substrate) 100 are packaged, liquid crystal molecules 40 needs to be dropped onto the opposite substrate 100 to form a liquid crystal layer 300 to realize the function of the liquid crystal display panel. That is, the liquid crystal layer 300 is disposed between the display substrate 200 and the opposite substrate 100.

Figure 3:
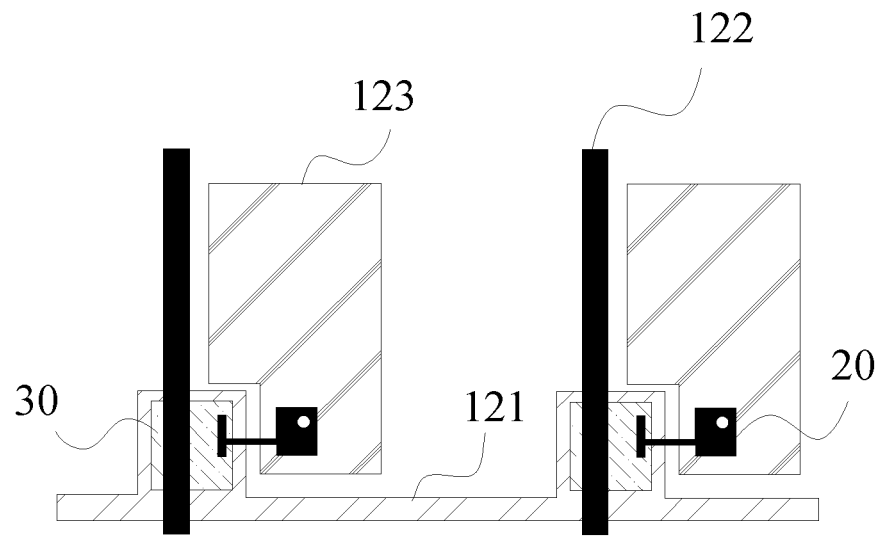
FIG. 3 is a partial structural view showing a conventional opposite substrate.

As described above, the power consumption of the current display panel is difficult to reduce, mainly due to the large load of the substrate on which the signal line is disposed, such as the opposite substrate or the display substrate in the display panel. Referring to FIG. 3, in the substrate (the opposite substrate or the display substrate), a plurality of electrodes and signal lines (which may comprise gate lines 121 and data lines 122) are provided in order to realize the function of the substrate. The gate line 121 and the data line 122 are formed of metal. Therefore, the loads of the gate line 121 and the data line 122 due to the resistance of the metal electrode lines themselves are mainly related to the metal materials and thicknesses of the gate line 121 and the data line 122. This part of the load is difficult to be reduced significantly. Moreover, the gate line 121 is used to control the switching of the plurality of thin film transistors (not shown in the drawing), and the data line 122 is responsible for writing the driving data from the control IC into the thin film transistor, and thus, there must be a certain overlapping area between the data lines 122 and the gate line 121. Thus, the capacitance ($C_{gd}$) between the gate line 121 and the data line 122 is also difficult to be avoided. Similarly, the pixel electrode 123 needs to be connected to the active layer 30 through the pixel electrode via 20, thus causing an inevitable overlapping area between the pixel electrode via 20 and the gate line 121, so that the capacitance ($C_{gs}$) between the gate line 121 and the pixel electrode via 20 also cannot be significantly reduced. Since the TN type panel also needs to form a vertical electric field between the display substrate and the opposite substrate to control the deflection of the liquid crystal molecules 40, there would be a capacitance formed between the signal lines such as the gate lines 121 and the data lines 122 and the common electrode located on the substrate (the display substrate or the opposite substrate), thereby further increasing the load of the substrate. Since the common electrode 220 has a large area, the overlapping area between the common electrode 220 and the signal lines is also large. The capacitance between the common electrode 220 and the signal lines 120 is also larger than the load such as $C_{gs}$, $C_{gd}$, and the like. Therefore, if the capacitance between the common electrode 220 and the signal lines 120 can be improved, the load of the substrate can be greatly reduced.

The inventors of the present application have conducted intensive studies and a large number of experiments and found that although it may be relatively difficult to improve the load of the substrate by improving the material, the thickness, and the position of the signal line 120 (the gate line 121, the data line 122, etc.), the shape of the common electrode 220 can be improved to reduce the overlapping area between the common electrode and the signal lines 120 without affecting the vertical electric field between the display substrate 200 and the opposite substrate 100, thereby reducing the load on the substrate. According to an embodiment of the present disclosure, the common electrode 220 may be hollowed out according to the shape of the signal line 120, thereby reducing the overlapping area between the common electrode 220 and the signal line 120, and reducing the capacitance therebetween.

Figure 4:
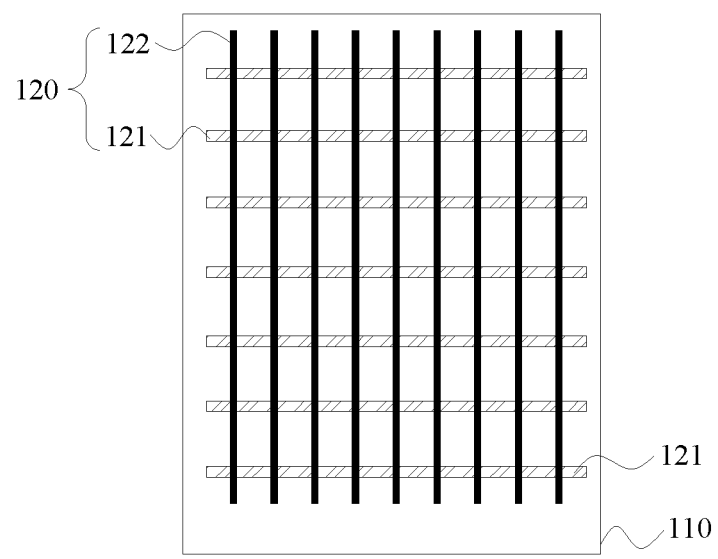
FIG. 4 shows a schematic structural view of an opposite substrate according to an embodiment of the present disclosure.

Specifically, referring to FIG. 4, the signal line 120 may include at least one of the gate line 121 and the data line 122. On the shape of the signal line, there is no particular limitation, and those skilled in the art can design according to the actual situation. For example, the signal line may be linear or the signal line may be zigzag. According to a specific embodiment of the present disclosure, referring to FIG. 4, the signal lines are linear. According to a specific embodiment of the present disclosure, a plurality of parallel-arranged gate lines 121 and a plurality of parallel-arranged data lines 122 may be disposed on the opposite substrate 110, and the gate lines 121 and the data lines 122 may be vertically disposed to each other. According to an embodiment of the present disclosure, the common electrode 220 may be subjected to a hollowing process according to the shapes of the gate line 121 and the data line 122 described above, to remove the metal (electrode material) at a position of the common electrode 220, which corresponds to the gate line 121 and/or the data line 122, thereby the overlapping area between the common electrode 220 and the signal line 120 can be reduced.

Figure 5:
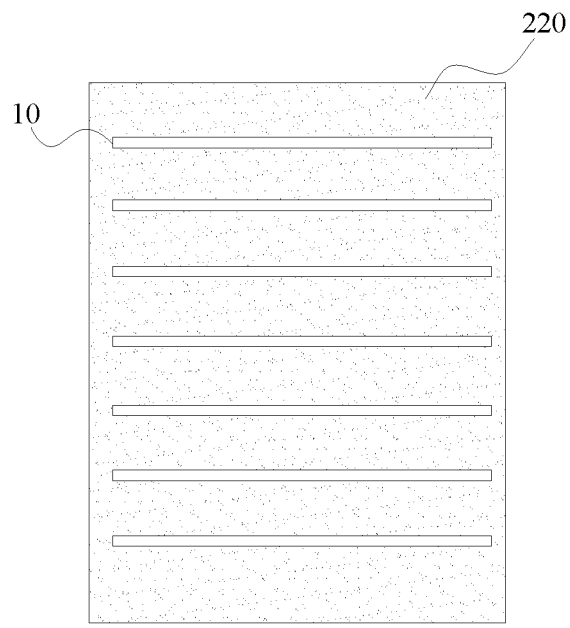
FIG. 5 shows a schematic structural view of a common electrode according to an embodiment of the present disclosure.
Figure 6:
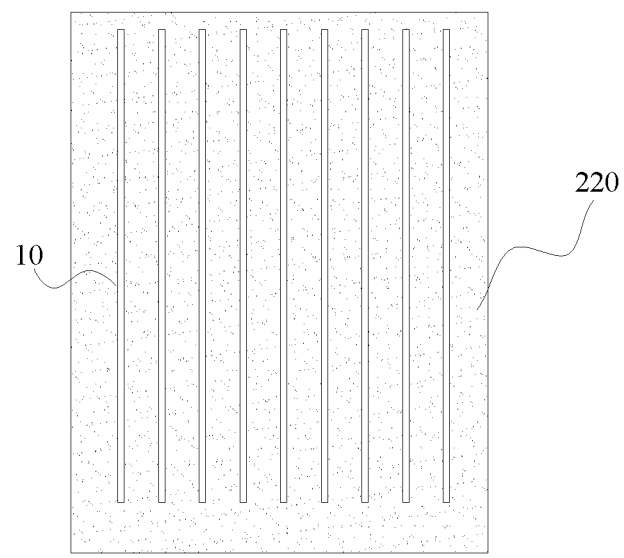
FIG. 6 shows a schematic structural view of a common electrode according to another embodiment of the present disclosure.

As described above, the common electrode 220 is used to form a vertical electric field between the display substrate 200 and the opposite substrate 100, and therefore, in practice, a fixed voltage is usually applied to the common electrode 220. According to an embodiment of the present disclosure, with reference to FIGS. 5 and 6, the portions of the common electrode 220 other than the hollowed-out portion 10 described above may be in communication with each other. In some embodiments, the common electrode 220 has a plurality of hollowed-out portions 10, but the common electrode 220 as a whole is an electrode that portions thereof communicate with each other. That is, in such an embodiment, there is no island electrode isolated in the common electrode 220. Thereby, it is easy to apply a fixed voltage to the common electrode 220 by a relatively simple wiring. However, the present disclosure is not limited thereto, and other embodiments may also be possible as long as a fixed voltage can be applied to the common electrode 220.

Figure 7:
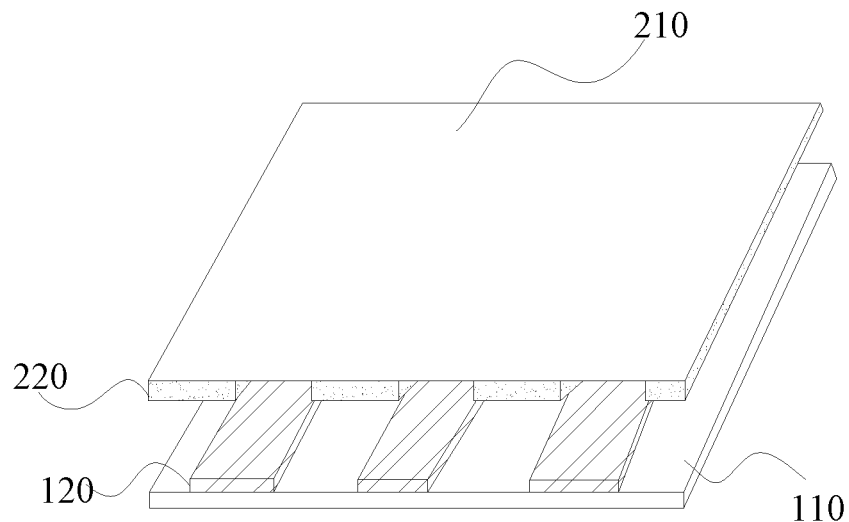
FIG. 7 is a schematic structural view of a display panel according to an embodiment of the present disclosure.

According to an embodiment of the present disclosure, the orthographic projection of the hollowed-out portion 10 on the opposite substrate 100 may overlap with at least a portion of the data line 122. That is to say, the common electrode 220 can be hollowed out according to the data line 122. Alternatively, according to another embodiment of the present disclosure, the orthographic projection of the hollowed-out portion 10 on the opposite substrate 100 may also overlap with at least a portion of the gate line 121. Thereby, the common electrode 220 can be hollowed out according to the gate line 121. According to some preferred embodiments of the present disclosure, referring to FIG. 7, the orthographic projections of the hollowed-out portions 10 on the opposite substrate 100 may correspond with the gate lines 121 in a one-to-one manner.

It should be understood that since the opposite substrate and the display substrate are aligned and bonded, it can be also deemed that the orthographic projection of the hollowed-out portion on the base substrate of the display substrate and the orthographic projection of the signal line (e.g., data line or gate line) on the base substrate may at least partially overlap. Similarly, the orthographic projections of the hollowed-out portions on the base substrate may correspond with the orthographic projections of the gate lines on the base substrate in a one-to-one manner.

Therefore, on one hand, the overlapping area between the gate line 121 and the common electrode 220 can be minimized, thereby reducing the load of the opposite substrate. On the other hand, the shape of the gate line 121 is relatively regular and has an area relatively greater than that of the data line 122. Therefore, when the orthographic projections of the hollowed-out portions 10 on the opposite substrate 100 is in one-to-one correspondence with the gate line 121s, the overlapping area between the common electrode 220 and the signal lines is largely reduced, and after the etching, the shape of the common electrode 220 is relatively regular, which is advantageous for maintaining the uniformity of the vertical electric field between the display substrate 200 and the opposite substrate 100.

According to an embodiment of the present disclosure, the display substrate may be an array substrate on which a TFT array is formed, or a color filter substrate on which a color filter is formed. According to an embodiment of the present disclosure, the signal lines may be located on the array substrate. The hollowed common electrode may be located on the array substrate or may be located on the color filter substrate.

In another aspect of the disclosure, the present disclosure provides a display device. According to an embodiment of the present disclosure, the display device includes the display substrate as described above. Thus, the display device has all the features and advantages of the display substrate as described above, which will not be repeatedly described herein. In general, the display device has an advantage of lower power consumption.

Figure 8:
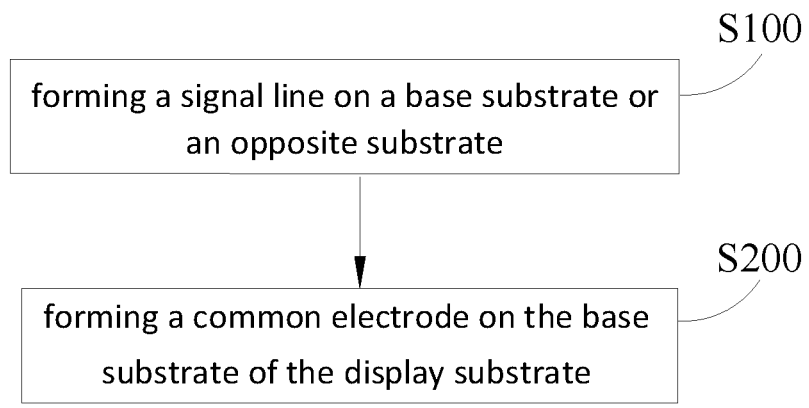
FIG. 8 is a flow chart showing a method of preparing a display substrate according to an embodiment of the present disclosure.

In another aspect of the present disclosure, the present disclosure proposes a method of preparing a display substrate. According to an embodiment of the present disclosure, a display substrate prepared according to the method may have the same features and advantages as the display substrate as described above. In a specific embodiment, referring to FIG. 8, the method includes following steps.

At step S100: forming a signal line on a base substrate or an opposite substrate According to an embodiment of the present disclosure, in this step, signal lines are formed on the base substrate or the opposite substrate. According to the embodiments of the present disclosure, there is no particular limitation on the specific type, arrangement, and the like of the signal lines formed in this step, which can be designed by those skilled in the art according to actual needs. For example, according to a specific embodiment of the present disclosure, the signal lines may include gate lines, data lines, and the like. The signal lines such as the gate lines and the data lines may have the same features as the signal lines in the display substrate as described above, which are thus not repeatedly described herein. Those skilled in the art can readily understand that the signal lines can be formed by depositing a metal layer on the base substrate or the opposite substrate, and performing exposure, development, etching, and the like. As an example, those skilled in the art will readily appreciate that a patterned etch mask (e.g., photoresist (PR)) may be formed by photolithography using a photolithographic mask (also referred to as a photolithographic reticle), and forming the signal line by etching the metal layer with the patterned etch mask. Thereby, a display substrate or an opposite substrate according to the embodiments of the present disclosure can be obtained. It should be noted that the substrate may also have structures such as a thin film transistor, a pixel electrode, or the like in order to realize the function of the substrate.

At step S200: forming a common electrode on the base substrate of the display substrate According to an embodiment of the present disclosure, in this step, a common electrode is formed on the base substrate of the display substrate. According to an embodiment of the present disclosure, the common electrode formed in this step may have the same features and advantages as the common electrode in the display substrate as described above. Specifically, a bulk ITO layer may be firstly deposited on the base substrate of the display substrate to form a common electrode layer. Then, the common electrode layer corresponding to the signal line is hollowed out to form a hollowed-out portion to obtain a common electrode. According to an embodiment of the present disclosure, the common electrode has hollowed-out portion(s) corresponding to the signal line(s) formed in the foregoing. That is to say, the orthographic projection of the hollowed-out portion of the common electrode on the opposite substrate corresponds to the signal line, and the correspondences comprises overlapping. It should be noted that in the present disclosure, "the orthographic projection of the hollowed-out portion on the opposite substrate corresponds to the signal line" should be understood broadly. That is, the orthographic projection of the hollowed-out portion on the opposite substrate may overlap with at least a portion of the orthographic projection of the signal line on the opposite substrate. Thereby, the overlapping area between the common electrode and the signal line can be effectively reduced, which is advantageous for reducing the power consumption of the display substrate. Thus, the display substrate according to the embodiments of the present disclosure can be obtained. It should be noted that the display substrate may also have structures such as a black matrix, pixel structures, filters, and the like to facilitate the function of the display substrate.

According to an embodiment of the present disclosure, in this step, the positions where the etching process takes place can be controlled such that portions of the finally formed common electrode other than the hollowed-out portions is in communication with each other. Thus, although the common electrode has a plurality of hollowed-out portions, the common electrode as a whole is an electrode that portions thereof communicate with each other. That is, there is no island electrode isolated in the common electrode. Thereby, it is easy to apply a fixed voltage to the common electrode with relatively simple wiring.

Figure 9:
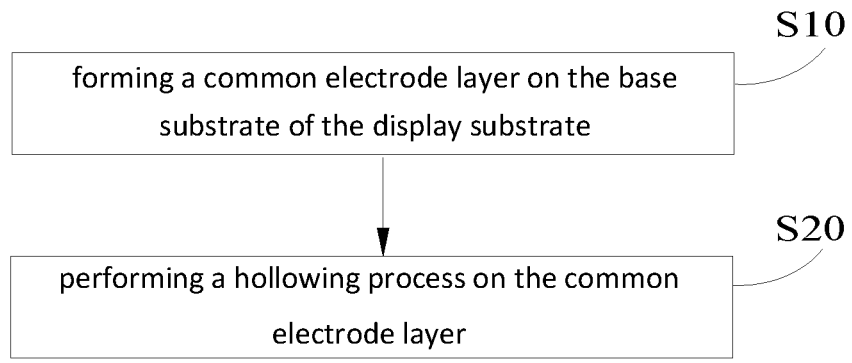
FIG. 9 shows a partial flow chart of a method of preparing a display substrate according to an embodiment of the present disclosure.

According to an embodiment of the present disclosure, referring to FIG. 9, forming a common electrode on a base substrate may be achieved by the following steps:

At step S10: forming a common electrode layer on the base substrate of the display substrate.

According to an embodiment of the present disclosure, in this step, a common electrode layer is formed on the base substrate of the display substrate. According to an embodiment of the present disclosure, a common electrode layer is deposited on the base substrate of the display substrate, the common electrode layer covering the entire upper surface of the base substrate of display substrate.

At step S20: performing a patterning process on the common electrode layer to form a common electrode having a hollowed-out portion corresponding to the signal line, wherein the signal line is at least one of a gate line and a data line.

According to an embodiment of the present disclosure, in this step, the common electrode layer is subjected to a hollowing process. In a specific implementation, a negative photoresist layer is coated on a side of the common electrode layer which is away from the base substrate, and the photoresist layer is exposed and developed based on a photolithographic reticle for forming a signal line to form an etch mask; the common electrode layer is etched based on the etch mask to form the hollowed-out common electrode according to the embodiments of the present disclosure. Thereafter, the etch mask can be stripped off. According to an embodiment of the present disclosure, the etch mask may be formed by exposing and developing the photoresist layer based on a lithography reticle for forming data lines. Thus, the data line lithography reticle can be utilized to form a hollowed common electrode. The orthographic projection of the hollowed-out portion on the base substrate and the orthographic projection of the data line on the base substrate may at least partially overlap.

Alternatively, according to another embodiment of the present disclosure, the etch mask may also be formed by performing exposure and development processing on the photoresist layer based on a photolithographic reticle for forming the gate lines. Thereby, the gate photolithography reticle can be used to form the hollowed common electrode. The orthographic projection of the hollowed-out portion on the base substrate at least partially overlaps with the orthographic projection of the gate line on the base substrate. Since the shape of the gate line is relatively regular, and the area of the gate line is slightly larger than the area of the data line, when the common electrode layer is etched by using the gate line photolithography mask, it is not necessary to manufacture additional photolithography reticle, and thus the production cost can be reduced. On the other hand, the overlapping area between the common electrode and the signal line obtained by etching with use of the gate line lithography reticle is reduced more, and the shape of the etched common electrode is more regular, which is advantageous to maintain the uniformity of the vertical electric field between the display substrate and the opposite substrate.

It is obvious that the present disclosure is not limited to such an embodiment, and in other implementations, an additional photolithography reticle may be utilized to perform the aforementioned photolithography and etching steps. In an example, a common electrode layer may be formed on the base substrate, the common electrode layer covering an upper surface of the base substrate. Thereafter, the common electrode layer may be etched using a patterned etch mask to form the hollowed-out portion. Here, the etch mask can be formed by processing a layer such as a photoresist (PR) using the aforementioned photolithographic reticle for forming the signal line or an additional photolithography reticle. Thereafter, the etch mask can be removed.

According to an embodiment of the present disclosure, after forming the display substrate and the opposite substrate, a liquid crystal layer may be formed between the display substrate and the opposite substrate, and the process of packaging is performed to form the display panel. It will be readily understood by those skilled in the art that liquid crystal molecules are filled between the display substrate and the opposite substrate and subjected to a packaging process to obtain a display panel. Thereby, a display panel with lower power consumption can be obtained.

In the description of the present specification, the description of the terms "an embodiment", "another embodiment" or the like means that the specific features, structures, materials or characteristics described in connection with the embodiments are included in at least one embodiment of the present disclosure. In the present specification, the recitation of the above terms is not necessarily directed to the same embodiment or example. Furthermore, the particular features, structures, materials, or characteristics described may be combined in a suitable manner in any one or more embodiments or examples. In addition, those skilled in the art will appreciated that various embodiments or examples described in the specification, as well as the features of the various embodiments or examples, may be combined and combined when appropriate.

While the embodiments of the present disclosure have been shown and described above, it is to be understood that the foregoing embodiments are illustrative only and are not to be construed as limiting the scope of the present disclosure. Various changes, modifications, substitutions and variations can be obtained by those skilled in the art from the embodiments without departing the scope the present disclosure.

What is claimed is:

1. A method of preparing a display panel, comprising:
    forming a common electrode on a base substrate of a first substrate;
    forming a hollowed-out portion, which corresponds to a signal line, in the common electrode by a patterning process,
    wherein the signal line includes at least one of a gate line and a data line,
    the method further comprising:
    forming the signal line on a second substrate which is opposite to the first substrate, by using a photolithographic mask;
    wherein forming the common electrode on the base substrate comprises:
        forming a common electrode layer on the base substrate, the common electrode layer covering an upper surface of the base substrate;
        coating a side of the common electrode layer which is away from the base substrate with a negative photoresist layer, exposing the negative photoresist layer based on the photolithographic mask which is used to form the signal line, and developing the negative photoresist layer, to obtain an etch mask; and
        etching the common electrode layer to form the hollowed-out portion based on the etch mask.

2. The method of claim 1, wherein the signal line is the data line and the photolithographic mask for the signal line is a photolithographic mask for forming the data line.

3. The method of claim 1, wherein the signal line is the gate line, and the photolithographic mask for the signal line is a photolithographic mask for forming the gate line.

4. The method of claim 1, wherein the first substrate is a color filter substrate or an array substrate.

5. The display panel of claim 1, wherein material of the common electrode in the hollowed-out portion is removed.

* * * * *

UNITED STATES PATENT AND TRADEMARK OFFICE
CERTIFICATE OF CORRECTION

PATENT NO. : 10,866,468 B2
APPLICATION NO. : 16/349870
DATED : December 15, 2020
INVENTOR(S) : Shiqiang Huang et al.

Page 1 of 1

It is certified that error appears in the above-identified patent and that said Letters Patent is hereby corrected as shown below:

In the Specification

Column 1, Line 12, Delete "i-sare" and insert -- are --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*